INVENTOR
Bernard C. Sheffer
BY *Edward H. Loveman*
ATTORNEY

INVENTOR
Bernard C. Sheffer

May 26, 1970      B. C. SHEFFER      3,513,738
AUTOMATIC SENSITOMETRIC FILM STRIP CUTTER

Filed June 2, 1967      5 Sheets-Sheet 4

INVENTOR
Bernard C. Sheffer
BY
Edward H. Loveman
ATTORNEY

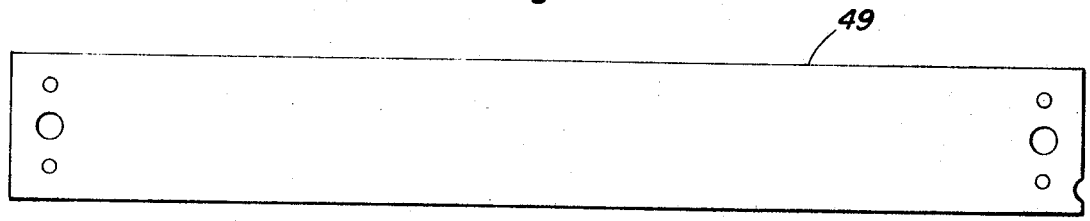
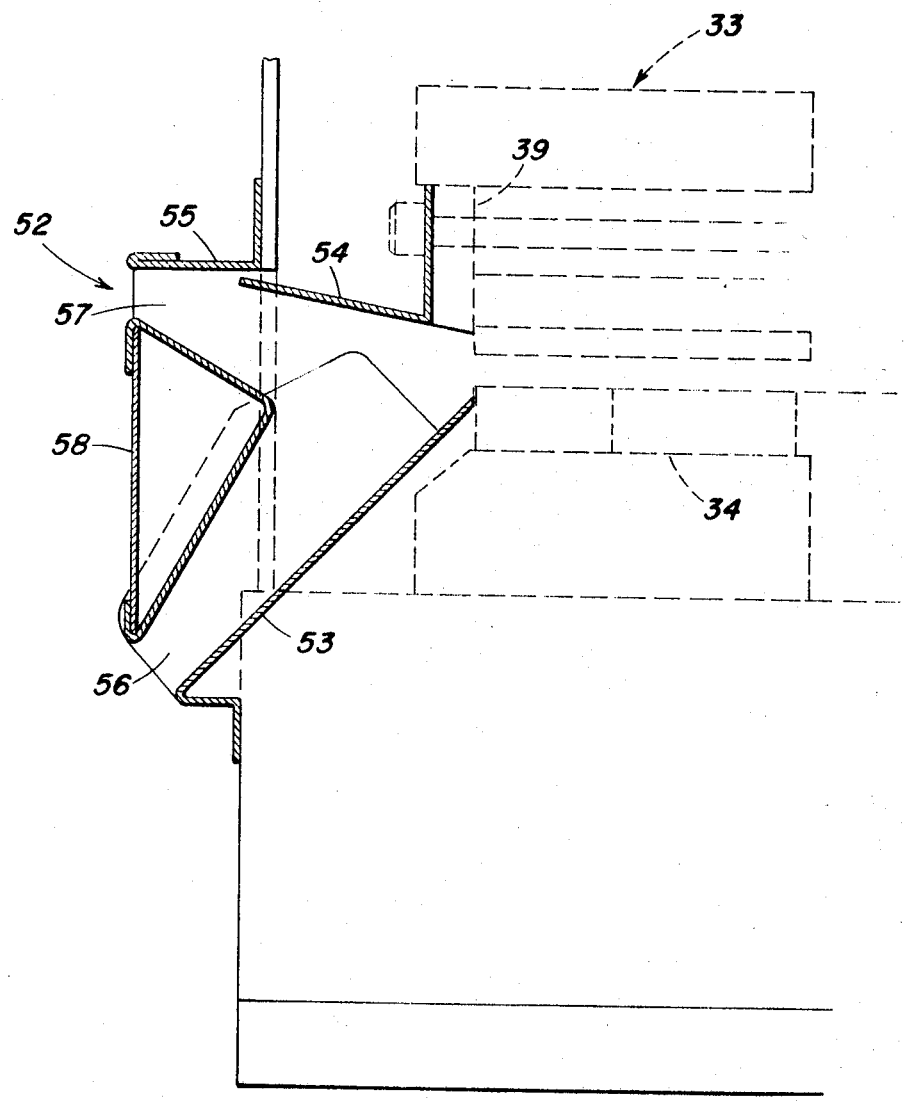

United States Patent Office 3,513,738
Patented May 26, 1970

3,513,738
AUTOMATIC SENSITOMETRIC FILM STRIP CUTTER
Bernard C. Sheffer, Binghamton, N.Y., assignor to GAF Corporation, New York, N.Y., a corporation of Delaware
Filed June 2, 1967, Ser. No. 643,103
Int. Cl. B26d 5/22
U.S. Cl. 83—105                                1 Claim

ABSTRACT OF THE DISCLOSURE

This invention relates to a novel strip cutter and punching apparatus used in cutting strips of a desired width and length from a web. In particular, it pertains to an apparatus adapted to intermittently advance a continuous web of film a predetermined distance by means of a feed roller. Concurrently therewith, the sides of the film web are trimmed to a required overall dimension through the use of rotary cutting knives. At the end of the advance cycle, the leading or advanced portion of the film web is perforated by a plurality of punches or pins and the preceding segment severed by a shearing die member, to thereby form an accurately dimensioned film strip.

---

This invention relates to strip cutters and, more particularly to improvements in film strip cutters which will automatically produce a desired quantity of accurate finish-cut film strips, including perforating holes used in processing, from a continuous web or coating slash prepared to a known oversized width.

In the manufacture and processing of certain types of sensitized material, such as photographic films and the like, at times it is desirable to analyze and test various film properties, sensitivities and characteristics. These tests are widely known and used in the technology, broadly classified as Sensitometry. Generally, a continuous roll of film, or a predetermined length thereof, called a "coating slash," which is to be tested is cut into strips. These film strips must be cut to relatively close dimensional tolerances since they are subsequently processed in existing testing or processing apparatus having precise physical configurations. It is also of some importance that a plurality of perforations or holes, which are spaced in a precise pattern, be made in the trimmed film strips. These perforations are used in the processing and identification of the film.

Heretofore, the trimming and perforating of the film strips from a continuous web or "coating slash" of film has been a tedious task, performed manually in a darkened chamber. An operator was required to accurately measure the film to be cut, under the aforementioned darkroom conditions, cut the film into strips, subsequently trim the edges of the strips to thereby obtain the desired strip length, and then perforate the strip so as to obtain the required processing and identification holes. Since a substantial quantity of strips may have been required, it became readily obvious that the prior art method and known devices did not satisfy the need of present day high-volume production requirements and accuracy in measurement.

The film strip cutter and punching apparatus according to the present invention overcomes the foregoing and other disadvantages encountered in the prior art by providing a novel apparatus which will efficiently and rapidly, in an automatic manner, sequentially sever into accurately dimensioned strips, punch a plurality of holes therethrough, and convey into a suitable receptacle, a length of film or a coating slash. To this effect, the invention employs an apparatus having intermittently actuated film feed rollers adapted to advance film in synchronous relationship with a film side-trimming rotary knife, and a combined strip-cutter shear and hole punching device. This will eliminate, to a great extent, manual manipulation of the film, while facilitating the rapid production of a predetermined number of accurately dimensioned, perforated film strips.

Accordingly, it is a primary object of the present invention to provide a novel web strip cutter apparatus facilitating the automatic production of accurately dimensioned strips from a continuous web.

Another object of the present invention is to provide a novel film strip cutter and punching apparatus adapted to slit into accurate strip form, while concurrently perforating holes, a continuous web or coated slash of film.

A further object of the present invention is to provide a novel film strip cutter and punching apparatus as described herein adapted to intermittently advance a web of film to be automatically cut and perforated into accurate film strips for sensitometry testing purposes.

A still further object of the present invention is to provide a novel film strip cutter and punching apparatus having a film web feed roller adapted to intermittently advance the web into the apparatus while the side edges of the web are trimmed by rotary slitting blades, and with the subsequent shearing and perforation of strip segments of the advanced film web taking place.

Still another object of the present invention is to provide a novel film strip cutter and punching apparatus as described herein, employing a novel over-running clutch to impart the intermittent advancing movement of the film web.

These and other objects and many of the attendant advantages of this invention will be readily appreciated as the same becomes better understood by reference to the following detailed description when considered in connection with the accompanying drawings in which:

FIG. 7 is a plan view of a typical film strip produced by the apparatus of the present invention; and FIG. 8 is an enlarged sectional view of the guide device shown in FIG. 1.

Figure 1:
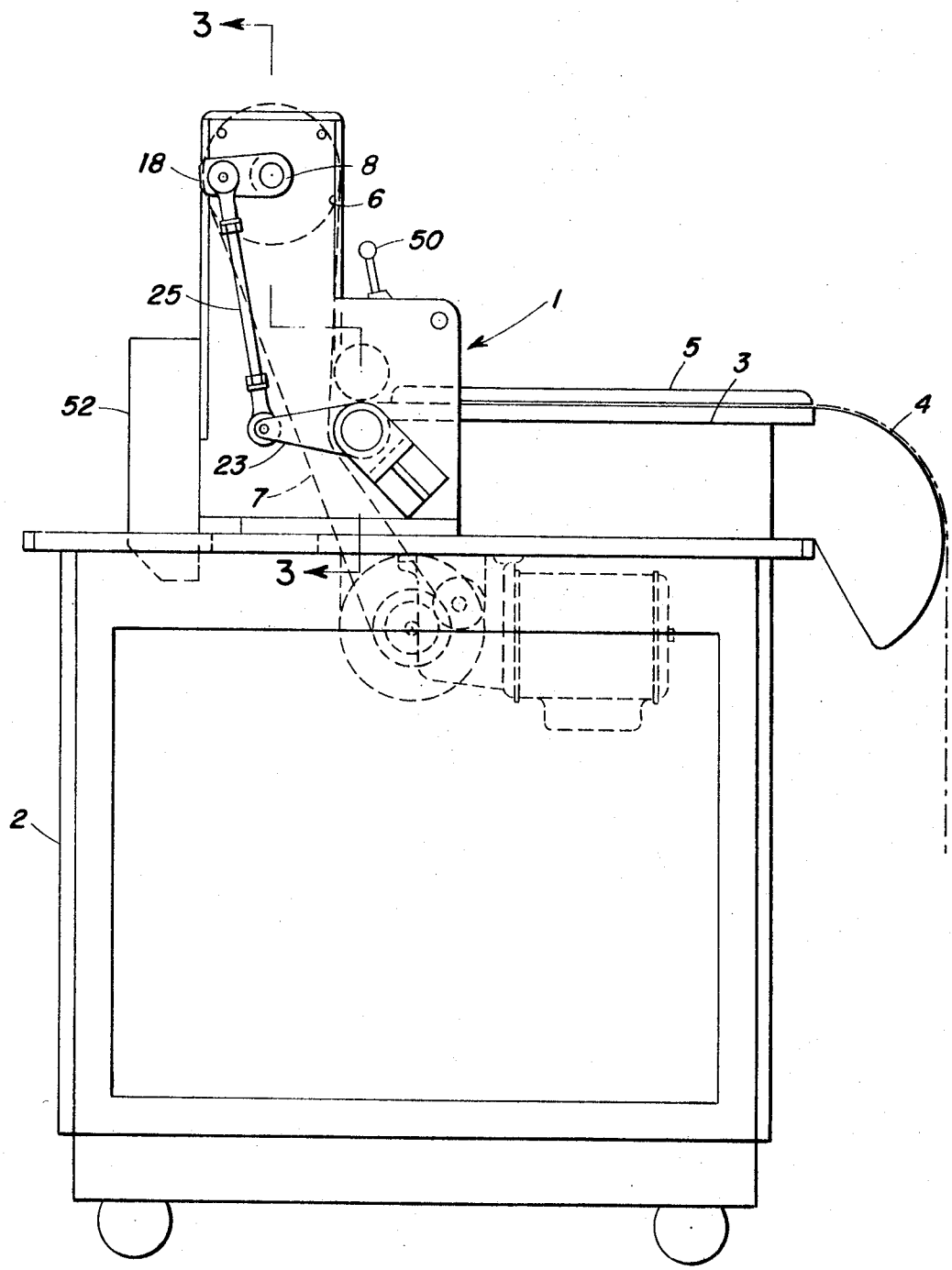
FIG. 1 is a side elevational view of the apparatus of the present invention, and with the external housing shown removed.
Figure 2:
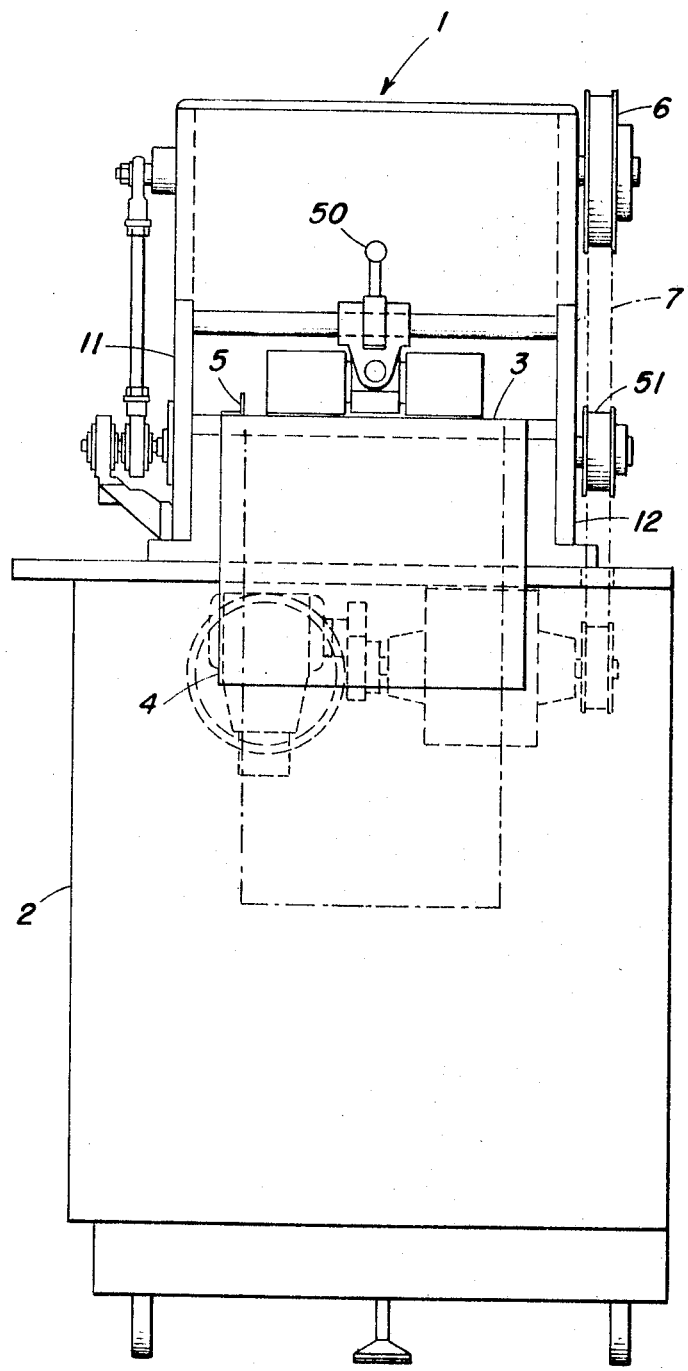
FIG. 2 is a front elevational view of the apparatus in FIG. 1.

Referring now to the drawings, wherein like reference characters designate like or corresponding parts throughout the several views, a strip cutter apparatus generally designated by reference numeral 1 may be mounted on a suitable movable cabinet 2. An electric motor or other source of motive power (shown in phantom) for driving the apparatus 1 may be housed within cabinet 2. A horizontal support platform 3, having a downwardly curved front portion 4 is adapted to provide a guide surface for a web or coated slash of film to be presented to the apparatus 1. A guide rail 5 assures correct infeed positioning and tracking of the film on support platform 3.

As the web of film is advanced into the apparatus 1, the operator may actuate the motor in the cabinet 2, thereby driving a pulley 6 by means of a belt drive 7. This in turn will actuate the various components of the apparatus to produce a finished film strip, to be described in greater detail with respect to FIG. 3 of the drawings.

Figure 3:
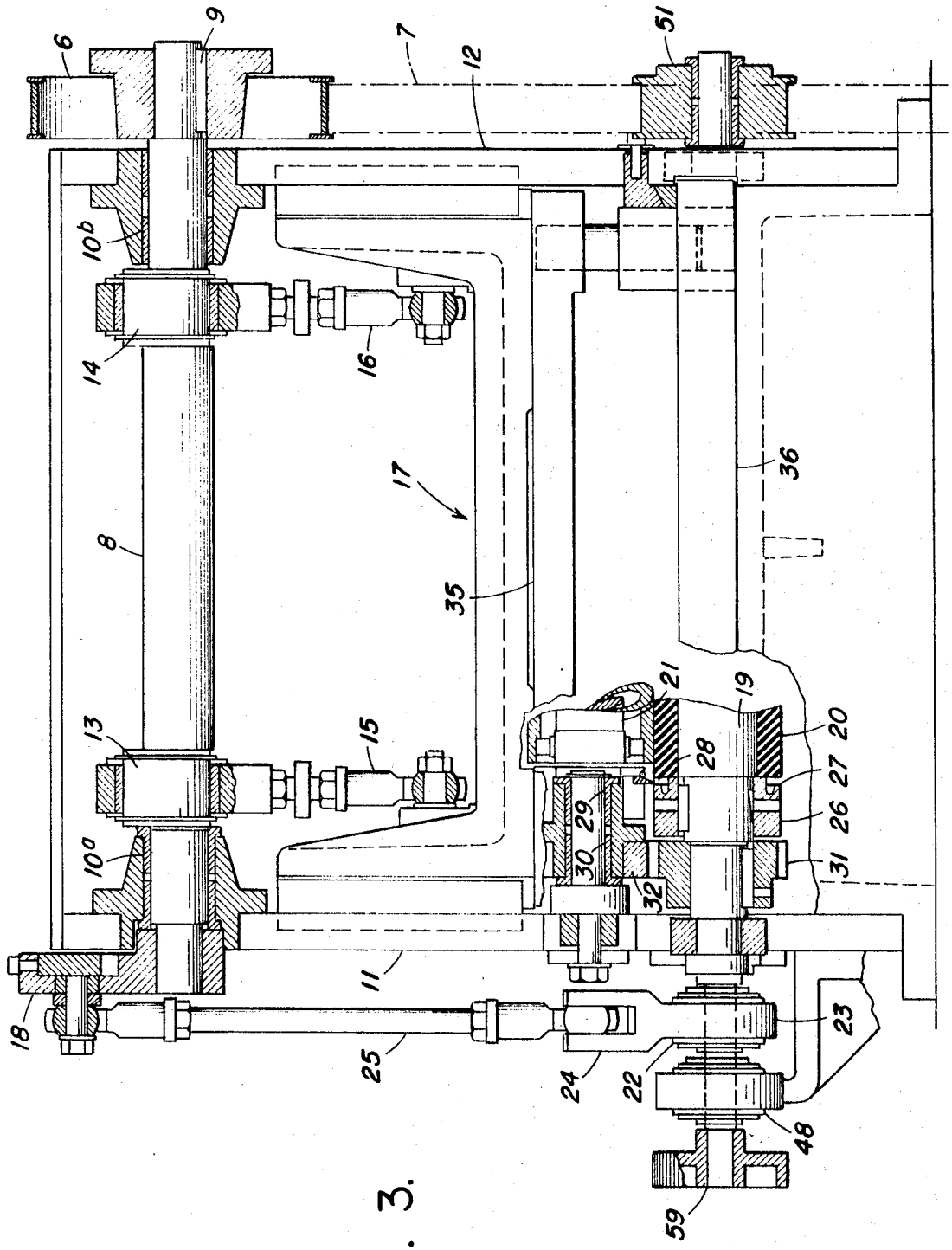
FIG. 3 is an enlarged detailed view, partially in section taken generally along line 3—3 in FIG. 1, and omitting the shear and punching die assembly.

Rotation of pulley 6 will turn a crankshaft 8, to which the former is attached by means of shaft key 9 (FIG. 3). Crankshaft 8 is rotatably journaled in bushings 10a and 10b which are positioned in side frame member 11 and 12 of apparatus 1. Eccentrics 13 and 14 riding on crankshaft 8 are connected by linkages 15 and 16 to the upper portion of a shearing die assembly 17, to be described more fully below. At the opposite end of crankshaft 8, remote from the end supporting pulley 6, a crankarm 18 is attached to the crankshaft so as to be rotatable therewith.

A feed roll shaft 19 is rotatably journaled in side frame members 11 and 12 in parallel spaced relationship with crankshaft 8. The feed roll shaft 19 has a feed roller 20 concentrically mounted thereon, in surface contact with a pressure or idler roller 21, and with said feed roller being adapted to advance the web of film into the apparatus between the bight of rollers 20 and 21. One end of shaft 19 extends outwardly of side frame member 11 and has an over-running or one-way clutch 22 mounted thereon. A swivel arm 23 is rigidly fastened to the outer race or periphery of clutch 22, and includes a clevis portion 24 adapted to engagingly receive a connecting rod 25 extending from crankarm 18, so as to essentially form a "four-bar" linkage system.

Adjacent to each end of feed roller 20, and interiorly of side frame members 11 and 12, is a rotary slitting knife 26 (only one shown) having a circular cutting blade 27. A coacting cutting blade 28 may be mounted on a suitable bushing 29 rotatably journaled on a stud shaft 30. Rotation may be imparted to cutting blade 27 by providing interengaging gears 31 and 32 positioned respectively on shafts 19 and 30.

Figure 4:
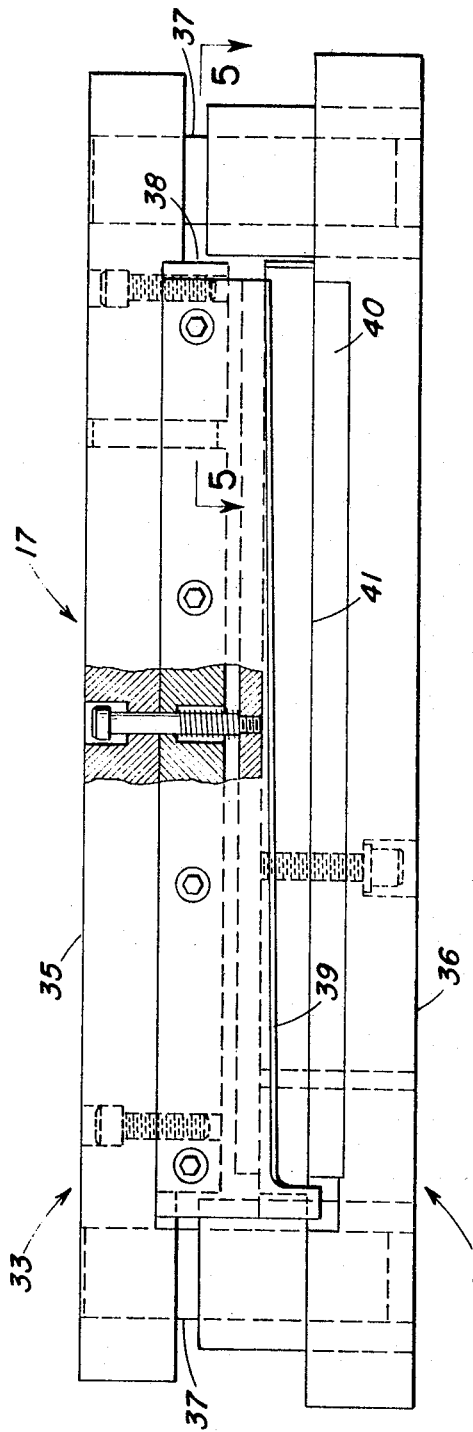
FIG. 4 is a front elevational view of the shear and punching die assembly of the present invention.
Figure 5:
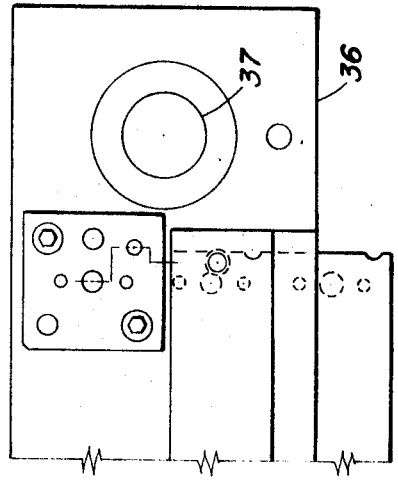
FIG. 5 is a sectional view along line 5—5 in FIG. 4.
Figure 6:
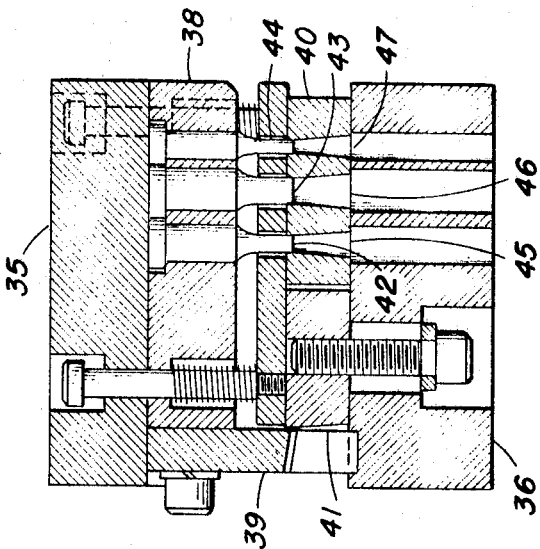
FIG. 6 is a plan view along line 6—6 in FIG. 5.

The shearing die assembly 17, referring now in particular to FIGS. 4, 5 and 6 of the drawings, includes an upper and lower die assembly, generally designated by reference numerals 33 and 34 respectively. The upper die assembly 33 includes a frame portion 35 reciprocable toward or away from a lower frame portion 36 on the lower die assembly 34. Alignment between frame portions 35 and 36 is maintained by means of two slide bushings 37, one at each end of die assembly 17. An upper punch plate 38 is fastened to the underside of frame portion 35 and has an elongate knife blade 39 extending along one longitudinal edge thereof. Similarly, frame portion 36 has a lower punch plate 40 attached to its upper surface, and has a knife edge 41 adapted to coact with knife blade 39 as clearly shown in FIG. 5. A plurality of punch members 42, 43, 44 project downwardly from upper punch plate 38, in alignment with corresponding apertures 45, 46, 47 in the lower punch plate 40.

In operation, when it is desired to obtain a plurality, as for example, twenty strips of a film web or coated slash, with each strip 10 inches long and 35 mm. wide; a continuous web or long segment of film is placed on support platform 3. The web preferably is overly wide, such as 11 inches. It is guided into the bight between rollers 20 and 21 through manual manipulation of a knob 59 and a second over-running clutch 48 on shaft 19 so as to correctly index the web of film in the apparatus with the leading edge thereof projecting past the knife of shearing assembly 17.

The motor in cabinet 2 is now started, and crankshaft 8 rotates as shown in FIG. 1. Concurrently therewith, eccentrics 13 and 14 will vertically reciprocate the upper portion of the shearing assembly 17, thereby severing the leading edge of the film. Rotation of crankshaft 8 will rotate crankarm 18 in a similar manner, thereby oscillating swivel arm 23 up and down through a predetermined arc for each revolution of crankarm 18. During the downswing of crankarm 18, swivel arm 23 will swing down and by means of over-running clutch 22, cause feed roller 20 to rotate forward by a predetermined angular amount. This, in turn, will advance the web of film into the apparatus 1 between rollers 20 and 21.

Concurrently with the advance of the film between the rollers, the side edges thereof are passed between the pairs of rotary slitter blades 27 and 28 positioned adjacent to each end of shaft 19. If the blades are spaced 10 inches apart, the web will then be trimmed to the exact 10 inch width required, or the precise length of each film strip.

During this period of film advance, the eccentrics 13 and 14 are positioned relative to the crankarm 18, so as to keep the upper and lower portions of shearing assembly 17 spaced apart. However, during the upstroke of crankarm 18, the direction of over-running clutch 22 is reversed by swing arm 23, thereby stopping the advance of the film web through the apparatus, since now shaft 19 remains stationary. At this time, the eccentrics 13 and 14 move the upper punch plate 38 of shearing assembly 17 towards lower punch plate 40. This, in effect, will cause knife blade 39 to overlap knife edge 41 and sever the strip of film which has moved therepast. Simultaneously therewith, the punching pins 42, 43, 44 will perforate the side trimmed portion of film web between the punch plates 38 and 40, and enter apertures 45, 46 and 47 in the lower punch plate. As the crankarm 18 completes a revolution, the cycle is repeated and successive strips of accurately cut film are severed from the web.

The apparatus is dimensioned so that each revolution of the crankarm 18 will advance the web of film exactly 35 mm., thereby creating finished film strips 35 mm. x 10 inches as may be seen in the illustrative strip 49 in FIG. 7 of the drawings.

In order to assure accurate movement in the advance of film strip, adjustable mountings may be provided in the crankarm 18, thus slightly altering the angular displacement of swing arm 23 and rotation of shaft 19.

Since it is essential that the web is firmly gripped between feed roller 20 and idler roller 21, suitable manually operable pressure regulating means 50 (FIG. 1) may be provided on the apparatus. Idler roller 21 may be suitably journaled in the housing of the apparatus.

A suitable idler roller 51 may be rotatably journaled on extended shaft 19. Thus the belt drive 7 passes over the idler roller 51 which applies adequate tension to the latter during periods of driving and is thereby rotated in a direction opposite to the rotation of the shaft 19. This counter rotation of idler roller 51 tends to apply a braking effect on shaft 19 during the upstroke of crankarm 18.

When the severed film strip is ejected from the apparatus 1 by the next or successive strip being advanced by rollers 20 and 21 toward shearing assembly 17, it is generally conveyed or guided into a suitable receptacle. In order to guide the severed segment or film strip into the receptacle, a sheet metal guide assembly 52 may be attached to the apparatus. The guide assembly may consist of a downwardly inclined plate 53 attached to the lower portion of the shearing assembly 17, and a slightly upwardly inclined plate 54 attached to the upper portion of the shearing assembly. The upper plate 54 may have an overlapping horizontal extension 55 attached to the housing of the apparatus. The resultant diverging passageway formed by plates 53 and 54 may be separated into two separate passageways 56 and 57 through the use of a substantially V-shaped barrier 58. This will assure proper guiding of the severed film strip through either of the passageways depending on whether the film is flat, warped or curled in either direction. Each of the plates forming the barrier 58 extends along the width of the apparatus and may be attached to its housing.

Experimentation in using the present cutter apparatus has proved it to be particularly advantageous in producing film strips from various types of film webs or coated slashes having widely divergent physical properties. One of the reasons has been the ultilization of the web feed roller 20, and rotary slitting knives 27, 28 having substantially identical diameters, and with the gears 31, 32 having pitch diameters equal to the diameter of the feed roller and of the rotary slitting knives.

It is also possible to employ suitable microswitches and electronic counters which will automatically sever a predetermined quantity of film strips, and then stop the machine without requiring any manual effort by the operator.

Other widths of film may be processed through the apparatus by simply varying the relationship of crankarm 18 and swivel arm 23 so as to change the rate of advance of the film web through rollers 20 and 21.

It should also be understood that the foregoing relates to only a preferred embodiment of the invention, and that it is intended to cover all changes and modifications of the example of the invention herein chosen for the purposes of the disclosure, which do not constitute departures from the spirit and scope of the invention.

What is claimed is:

1. A sensitized film strip cutter and multi-hole punching apparatus adapted to provide successive finish-cut accurately dimensioned segments of film strip from a continuous photographic film web presented thereto, comprising;
   drive means,
   feed roller means coupled to said drive means and intermittently advancing a predetermined length of said photographic web into said apparatus,
   rotary edge cutting means coupled to said feed roller means and adapted to rotate and precisely trim only the side edges of said photographic film web as said film web is advanced past said feed roller means during periods of said film web advance.
   cooperative shear and multi-hole punching means linked to said feed roller means and operative between each period of film web advance, said multi-hole punching means comprising a plurality of punching pins while adjacent each of the so-trimmed side edges thereof while said shear means concurrently transversely severs a preceding segment of said film web to thereby simultaneously form the leading edge of a successive film strip,
   a support frame having at least two side frame members,
   a first shaft extending between said side frame members and rotatably journaled therein,
   means interconnecting said cooperative shear and multi-hole punching means and said shaft and adapted to impart operative reciprocation to the former in response to rotation of said shaft,
   said feed roller means including a driven feed roller extending between said side frame members and rotatably journaled therein, and an idler roller in compressive, parallel relationship with said driven roller, and
   a linkage means interconnecting said first shaft and driven feed roller and adapted to impart intermittent rotational movement to said driven feed roller in response to rotation of said first shaft, wherein said linkage means includes a four-bar linkage system, said four-bar linkage system comprising,
   a crankshaft arm attached to one end of said first shaft and rotatable therewith,
   a lost-motion member fastened to one end of said driven feed roller and including a swivel arm mounted thereon, and
   a connecting rod interconnecting the distal ends of said crankshaft arm and of said swivel arm, whereby rotation of said first shaft imparts intermittent rotation to said driven feed roller in the direction of film web advance, and in which said lost-motion member comprises an over-running clutch, to thereby intermittently rotate said driven feed roller through a predetermined angular rotational displacement in the direction of film web advance and to correspondingly advance said film web through said apparatus, and a second over-running clutch in communication with said first mentioned over-running clutch, said second clutch being adapted to provide manual indexing and advancement of said film web into said apparatus.

References Cited

UNITED STATES PATENTS

| | | | |
|---|---|---|---|
| 467,316 | 1/1892 | Talcott | 83—408 X |
| 1,340,137 | 5/1920 | Pfister | 83—408 X |
| 1,443,159 | 1/1923 | Wood et al. | 83—106 |
| 1,515,262 | 11/1924 | Magnuson | 83—104 X |
| 1,543,434 | 6/1925 | Hardman | 83—104 |
| 1,734,385 | 11/1929 | Bombard et al. | 83—105 |
| 1,977,000 | 10/1934 | Landrock. | |
| 2,285,447 | 6/1942 | Lichter | 83—214 X |
| 2,542,630 | 2/1951 | Conner | 83—104 |
| 3,076,368 | 2/1963 | Groll | 83—257 X |
| 3,266,357 | 8/1966 | Littell | 83—244 X |

FRANK T. YOST, Primary Examiner

U.S. Cl. X.R.

83—167, 222, 244, 249, 408

Disclaimer 3,513,738.—*Bernard C. Sheffer*, Binghamton, N.Y. AUTOMATIC SENSITO-
METRIC FILM STRIP CUTTER. Patent dated May 26, 1970. Disclaimer filed Sept. 30, 1982, by the assignee, *Eastman Kodak Co.*

Hereby enters this disclaimer to all claims of said patent.

[*Official Gazette April 5, 1983.*]